United States Patent [19]

Glaser et al.

[11] Patent Number: 5,430,102

[45] Date of Patent: Jul. 4, 1995

[54] MODIFIED HIGH HEAT AMORPHOUS CRYSTALLINE BLENDS

[75] Inventors: Raymond H. Glaser, Mt. Vernon; Darryl Nazareth, Evansville, both of Ind.; Jerry J. Yang, Su-Ao, I-Lan, Taiwan

[73] Assignee: General Electric, Pittsfield, Mass.

[21] Appl. No.: 28,061

[22] Filed: Mar. 8, 1993

[51] Int. Cl.⁶ .................... C08G 75/02; C08L 81/02; C08L 79/08

[52] U.S. Cl. .................. 525/179; 525/180; 525/189; 525/436; 525/537

[58] Field of Search ............. 525/179, 180, 189, 436

[56] References Cited

U.S. PATENT DOCUMENTS

| | | |
|---|---|---|
| 3,658,938 | 4/1972 | Kwiatkowski et al. |
| 4,017,555 | 4/1977 | Alvarez . |
| 4,258,155 | 3/1981 | Holub et al. . |
| 4,293,670 | 10/1981 | Robeson et al. . |
| 4,340,697 | 7/1982 | Aya et al. . |
| 4,427,830 | 1/1984 | Giles, Jr. ............... 525/180 |
| 4,433,104 | 2/1984 | Giles, Jr. ............... 525/180 |
| 4,455,410 | 6/1984 | Giles, Jr. ............... 525/180 |
| 4,544,700 | 10/1985 | Wright ................... 525/189 |
| 4,588,779 | 5/1986 | Smearing ............... 525/180 |
| 4,769,424 | 9/1988 | Takekoshi et al. . |
| 4,868,240 | 9/1989 | Ichikawa et al. ....... 525/436 |
| 5,086,125 | 2/1992 | Ohta et al. . |
| 5,149,749 | 9/1992 | Blackwell et al. ..... 525/436 |
| 5,157,085 | 10/1992 | Ohta et al. ............. 525/436 |

FOREIGN PATENT DOCUMENTS

| | | |
|---|---|---|
| 0268765 | 6/1988 | European Pat. Off. . |
| 0294129 | 12/1988 | European Pat. Off. . |
| 445588 | 9/1991 | European Pat. Off. . |
| 63-312355 | 12/1988 | Japan . |
| 04148935A | 10/1990 | Japan . |

*Primary Examiner*—Melvyn I. Marquis
*Assistant Examiner*—Helen F. Lee

[57] ABSTRACT

Disclosed are thermoplastic resin compositions having improved heat resistance, e.g., IR soldering and HDT; increased ductility and flowability; and reduced flash. In particular, the thermoplastic resin compositions have at least one high heat amorphous resin, at least one polysulfide; and, optionally, at least one reinforcing filler and/or at least one polyolefin. The high heat amorphous resin is preferably a polyetherimide and the polyolefin is preferably a high crystalline polyethylene. The compositions of the invention are particularly well suited for preparing no flash high heat electrical connectors.

25 Claims, 10 Drawing Sheets

MODIFIED HIGH HEAT AMORPHOUS CRYSTALLINE BLENDS

BACKGROUND OF THE INVENTION

This invention relates to polysulfide/polyetherimide blends. More particularly, this invention relates to polysulfide/polyetherimide/reinforcing filler blends which optionally include a polyolefin therein. The blends of this invention have enhanced heat capabilities such as a high heat distortion temperature and enhanced blister resistance under increased IR soldering temperatures; improved chemical resistance; and improved flow properties. Additionally, the compositions of the invention are useful in preparing molded parts such as electrical connectors which exhibit substantially low levels of flash.

SUMMARY OF THE INVENTION

The present invention relates to a thermoplastic resin composition having improved heat resistance. In particular, the thermoplastic resin composition comprises at least one high heat amorphous resin, at least one polysulfide, and at least one polyolefin and/or at least one reinforcing filler. In a preferred embodiment of the invention, the above composition is used in preparing no-flash high heat molded parts such as electrical connectors.

DETAILED DESCRIPTION OF THE INVENTION

Polysulfides useful in the composition of the present invention are polymers composed substantially of linear molecules of moderate molecular weight having repeating units of the structural formula (I):

$$-[-R_1-S_n-]- \tag{I}$$

wherein $R_1$ is a divalent aliphatic or aromatic radical and "n" is a whole number ranging from 1 to 5, generally 1.

Preferably, $R_1$ is an aromatic radical such as phenylene, biphenylene, naphthylene, oxydiphenyl, or lower alkyl, lower alkoxy or halogen substituted derivatives thereof. The lower alkyl substituents typically have one to six carbon atoms, e.g., methyl, propyl, isobutyl, n-hexyl, etc. Generally, the aromatic polysulfide polymer will have an inherent viscosity within the range of about 0.05 to about 0.4, preferably about 0.1 to about 0.35, determined at 206° C. in 1-chloronaphthalene at a polymer concentration of 0.4 g/100 ml solution.

A particularly preferred polysulfide is a polyphenylene sulfide having repeating units of the formula: $-[-R_1-S-]-$, wherein $R_1$ is a phenylene moiety. Such polyphenylene sulfides (PPS) have high melting points, outstanding chemical resistance, thermal stability and non-flammability. The polymer is characterized by high stiffness and good retention of mechanical properties at elevated temperatures.

The polysulfides used in the present invention can be prepared according to methods known in the art. Reference is made, for example, to U.S. Pat. Nos. 3,354,129 and 3,843,614, both of which are incorporated by reference herein.

Aromatic polysulfides can be prepared according to the method disclosed in U.S. Pat. No. 3,354,129, wherein a polyhalo-substituted cyclic compound containing unsaturation between adjacent ring atoms and an alkali metal sulfide are contacted in the presence of a polar organic compound. The resulting polymer contains the cyclic structure of the polyhalo-substituted compound coupled in repeating units through a sulfur atom. Aromatic polysulfides can also be manufactured as described in U.S. Pat. No. 2,513,188 (which is incorporated by reference herein) by reacting mixtures of p-dichlorobenzene and 1,2,4-trichlorobenzene with sulfur and metal sulfide at fusion temperatures. The polymers can also be manufactured by the method described in British Pat. No. 962,941 wherein metal salts of halothiophenols are heated at a polymerizing temperature.

Aliphatic polysulfide polymers can be prepared according to the method described in U.S. Pat. No. 3,843,614, wherein sodium polysulfide is reacted with a reactive halide such as ethylene dichloride. Other viable methods can be found in Kirk-Othmer Encyclopedia of Chemical Technology, Vol. 16, pp.253-272, John Wily & Sons (1968).

The polysulfides of the invention are useful at both the high loading levels and the low loading levels. For example by adding large amounts of polysulfide, it is possible to provide a themoplastic resin composition having excellent heat and chemical resistance with reduced warpage and IR blistering. Accordingly, the amount of the polysulfide ranges from about 33.5 to about 76.5 percent, more preferably from about 42 to about 69 percent, and most preferably from about 46 to about 61.5 percent of the thermoplastic resin composition. As the amount of polysulfide is decreased below these levels it becomes increasingly more difficult to successfully mold parts out of the resulting thermoplastic resin composition and even when successful molding is achieved, the resulting chemical performance is questionable.

Alternatively, in applications where the chemical performance requirements are not so stringent, it is possible to include low levels of polysulfide which dramatically boost the heat resistance of the resin, e.g., the IR blister resistance, without adversely affecting the beneficial properties of the high heat amorphous resin. Accordingly, for this embodiment of the invention, the amount of the polysulfide added to the thermoplastic resin blend is sufficient to raise the blister resistance temperature of the high heat amorphous resin, e.g., polyetherimide (PEI), substantially above about 200° C., and more preferably above about 210° C. for a 30% glass filled PEI. It will be recognized by the skilled artisan, however, that the exact blister resistance temperature will vary according to the particular high heat amorphous resin selected. However, as a general rule, the amount of the polysulfide added to the thermoplastic resin blend will generally range from about 10 to about 35 percent, and more preferably, from about 15 to about 25 percent of the thermoplastic resin composition. The present invention combines the above polysulfides with at least one high heat amorphous resin and a reinforcing filler and/or a polyolefin in order to achieve the remarkable combination of properties alluded to above. High heat amorphous resins are, per se, well known in the art. The present invention contemplates the use of virtually any high heat amorphous resin. A number of the more common high heat amorphous resins include polyetherimides, polysulfones, polyarylsulfones, polyethersulfones, or poyl(aryl ethers) such as polyphenylene ether, with polyetherimides being the most preferred for a number of specific applications, i.e., high heat electrical connectors.

Polyetherimides suitable for use in this invention generally have the formula:

(II)

wherein "m" represents a whole number in excess of 1, e.g., 10 to 10,000 or more. In formula (II), the group
—O—A<
is selected from:

wherein R' is hydrogen, a lower alkyl or lower alkoxy radical.

In formula (II), Z is a member of the class consisting of (1)

and (2) divalent organic radicals of the general formula:

wherein X is a member selected from the class consisting of divalent radicals of the formulas and "q" is 0 or 1 and "y" is a whole number from 1 to 5.

In the polyetherimide represented by formula (II) above, R is a divalent organic radical selected from the class consisting of (1) aromatic hydrocarbon radicals having from 6 to 20 carbon atoms and halogenated derivatives thereof, (2) alkylene radicals and cycloalkylene radicals having from 2 to 20 carbon atoms, (3) C(2-8) alkylene-terminated polydiorganosiloxane, and (4) divalent radicals having the general formula wherein Q is a member selected from the class consisting of wherein "x" is a whole number from 1 to 5 inclusive.

The most preferred polyetherimides for use in this invention are those wherein —O—A<
and Z respectively are and R is selected from

The polyetherimides wherein R is metaphenylene am most preferred.

The polyetherimides useful in this invention can be made according to methods known in the art. For example, polyetherimides can be made by reacting an aromatic bis(ether anhydride) with an organic diamine.

Aromatic bis(ether anhydrides) typically used in the preparation of polyetherimides are those having the general formula wherein Z is as defined hereinbefore.

Organic diamines which can be used in the preparation of polyetherimides have the general formula

H$_2$N—R—NH$_2$ where R is as defined hereinabove.

Examples of specific aromatic bis(ether anhydrides) and organic diamines are disclosed, for example, in U.S. Pat. No. 4,455,410, which is incorporated by reference herein.

Examples of aromatic bis(ether anhydrides) include 2,2-bis[4-(2,3-dicarboxyphenoxy)phenyl]propane dianhydride, 4,4'-bis( 2,3-dicarboxyphenoxy)diphenyl ether dianhydride, and 1,3-bis(2,3-dicarboxyphenoxy)benzene dianhydride.

Examples of suitable organic diamines include, for example, m-phenylenediamine, p-phenylenediamine, and 4,4'-diaminodiphenylpropane.

In general, the polyetherimide-forming reactions can be advantageously carded out using well-known solvents, e.g., o-dichlorobenzene, m-cresol/toluene, and the like, in which to effect interaction between the dianhydrides and the diamines, at temperatures of from about 100° C. to about 250° C. Alternatively, the polyetherimides can be prepared by melt polymerization of any of the above dianhydrides with any of the above diamine compounds while heating the mixture of ingredients at elevated temperatures with concurrent intermixing. Generally, melt polymerization temperatures between about 200° C. to 400° C., and preferably 230° C. to 300° C. can be used. The conditions of the reaction and the proportions of ingredients can be varied widely depending on the desired molecular weight, intrinsic viscosity, and solvent resistance. In general, equimolar amounts of diamine and dianhydride are used for high molecular weight polyetherimides, however, in certain instances, a slight molar excess (about 15 mol percent) of diamine can be used resulting in the production of polyetherimides having terminal amine groups. Generally, useful polyetherimides have an intrinsic viscosity greater than 0.2 deciliters per gram, preferably 0.35 to 0.60, or 0.7 deciliters per gram or even higher when measured in m-cresol at 25° C.

Similarly, as indicated above, other common high heat amorphous resins, and ones which is preferred according to the present invention, are polysulfones. As a polysulfone resin usable in the present invention, a linear polymer containing three kinds of unit bonds consisting of an arylene bond, an ether bond and a sulfone bond, is suitable. Representative examples of these aromatic polysulfone resins include those represented by the following formulae:

These aromatic polysulfones are easily manufactured by the methods disclosed, for example, in Japanese Patent Application Publication No. 7799/1967 and Japanese Patent Application Publication No. 617/1972, and one and/or not less than two kinds of them may be optionally selected in accordance with the desired melt blend. Additional high heat amorphous resins which are preferred according to the invention are poly(aryl ether) resins such as polyphenylene ether. The polyphenylene ether resin is normally a homo- or copolymer having units of the formula wherein Q, Q', Q'', Q''' are independently selected from the group consisting of hydrogen, halogen, hydrocarbon, halohydrocarbon, hydrocarbonoxy and halohydrocarbonoxy; and n represents the total number of monomer units and is an integer of at least about 20, and more usually at least 50.

The polyphenylene ether resin can be prepared in accordance with known procedures, such as those described in Hay, U.S. Pat. Nos. 3,306,874 and 3,306,875; and Stamatoff, U.S. Pat. Nos. 3,257,357 and 3,257,358; from the reaction of phenols including but not limited to 2,6-dimethylphenol; 2,6-diethylphenol; 2,6-dibutylphenol; 2,6-dilaurylphenol; 2,6-dipropylphenol; 2,6-diphenylphenol; 2-methyl-6-tolylphenol; 2-methyl-6-methoxyphenol; 2,3,6-trimethylphenol; 2,3,5,6-tetrametylphenol; and 2,6-diethyoxypheol.

Each of these may be reacted alone to produce the corresponding homopolymer, or in pairs or with still other phenols to produce the corresponding copolymer. Examples of the homopolymer include poly(2,6-dimethyl-1,4-phenylene)ether, poly(2,6-diethyl-1,4-phenylene)ether, poly(2,6-dibutyl- 1,4-phenylene)ether, poly(2,6-dilauryl-1,4-phenylene)ether, poly(2,6-dipropyl-1,4-phenylene)ether, poly(2,6-diphenyl-1,4-phenylene)ether, poly(2-methyl-6-methoxy-1,4-phenylene)ether, poly(2-methyl-6-butyl-1,4-phenylene)ether, poly(2,6-dimethoxy-1,4-phenylene)ether, poly(2,3,6-trimethyl-1,4-phenylene)ether, poly(2,3,5,6-tetramethyl-1,4-phenylene)ether, and poly(2,6-diethyoxy-1,4-phenylene)ether. Examples of the copolymer include, especially those of 2,6-dimethylphenol with other phenols, poly(2,6-dimethyl-co-2,3,6-trimethyl-1,4-phenylene)ether and poly( 2,6-methyl-co-2-methyl-6-butyl-1,4-phenylene)ether.

For the purposes of the present invention, an especially preferred family of polyphenylene ethers includes those having alkyl substitution in the two positions ortho to the oxygen ether atoms, i.e. those of the above formula wherein Q and Q' are alkyl, most preferably having 1 to 4 carbon atoms. Illustrative members of this class are: poly(2,6-dimethyl-1,4-phenylene)ether; poly(2,6-diethyl-1,4-phenylene)ether; poly (2-methyl-6-ethyl-1,4-phenylene) ether; poly(2-methyl-6-propyl-1,4-phenylene)ether; poly(2,6-dipropyl-1,4-phenylene)ether; poly (2-ethyl-6-propyl-1,4-phenylene) ether; and the like.

By adding a high heat amorphous resin to the polysulfide, in combination with the reinforcing filler and/or the polyolefin, it was surprisingly discovered that the resulting composition had a unique combination of beneficial properties. One of the most surprising discoveries was that by combining the above components in the appropriate amounts, it was possible to create a resin composition with no flash capabilities. The term "no flash" resin composition is intended to include not only those compositions which exhibit no flash, but also those compositions which exhibit substantially no flash characteristics.

Thus, according to one embodiment of the invention, the high heat amorphous resin is added in an amount sufficient to provide a thermoplastic resin composition which exhibits no flash capabilities. In another embodiment of the invention, the high heat amorphous resin is added in an amount ranging from about 0.5 to about 43.5 percent by weight of the overall thermoplastic resin composition. More preferably, the amount of the high heat amorphous resin ranges from about 8 to about 35 percent by weight of the overall thermoplastic resin composition. It it highly preferred that the amount of the high heat amorphous resin ranges from about 15 to about 31 percent by weight of the overall thermoplastic resin composition.

However, according to another embodiment of the invention where the polysulfide is added in minor amounts, the amount of the high heat amorphous resin may be increased to compensate for the decrease in the amount of polysulfide. Thus, the amount of the high heat amorphous resin could also range anywhere from about 40 to about 70 percent, or more preferably from about 50 to about 65 percent of the thermoplastic resin composition.

The compositions of this invention contain not only high heat amorphous resins and polysulfides, but optionally a small amount of a polyolefin. Polyolefins are commercially available in a variety of molecular structures. The chemical and physical properties of these polymers depend largely upon the temperatures, pressures, catalyst types, modifiers, and reactor design used in the manufacture of the particular polyolefin. For uses in the present invention, the polyolefin should preferably be of the high density type., e.g., high density polyethylene (HDPE).

However, almost any high molecular weight high density polyolefins can also be used in the present invention. High molecular weight high density polyolefins is a name given to those high density polyolefin resins having a high weight average molecular weight (Mw), e.g., between about 300,000 and 500,000 for polyethylene. Yet another high density polyolefin that may be used in the present invention is known as ultra high molecular weight polyolefin. Generally these resins have a molecular weight ranging in the millions, e.g., about 3 million to about 6 million for polyethylene.

Preferably, the polyolefin of the invention is of high crystallinity. By the term "high crystallinity" it is understood that the polyolefin has a crystallinity greater than about 50%. More preferably, the crystallinity of the polyolefin ranges from about 60% to about 90%. In a particularly preferred embodiment of the invention, the polyolefin is comprised primarily of polyethylene, polypropylene and/or polybutylene, with polyethylene being the most preferred.

It is preferred that the polyolefin be added in an amount sufficient to increase the release properties of the resin composition, i.e., an amount sufficient to reduce mold adherence and the like. Given the low heat deflection temperature of polyolefins in general, e.g., about 130° C. for glass reinforced polyethylene, it was expected that the heat distortion temperature of the high heat amorphous resin/polysulfide blend would have been adversely affected by including a polyolefin therein. Quite surprisingly, however, it was discovered that by adding a polyolefin to the high heat amorphous resin/polysulfide blend, that the heat distortion temperature of the blend increased rather than decreased. Thus, in another preferred embodiment, the polyolefin is added in an amount sufficient to provide an increase in the heat deflection temperature of the thermoplastic resin composition.

Generally, the amount of polyolefin that is blended with the thermoplastic resin composition ranges from about 0.1 to about 5 weight percent of the total thermoplastic resin blend. Preferably, the amount of polyethylene ranges from about 0.1 to about 1 weight percent of the thermoplastic blend.

While the modified thermoplastic resin composition may contain from about 0.1 to 2.5 weight percent of polyolefin, it may be desirable to make a concentrate for subsequent blending with unmodified high heat amorphous resins, e.g., polyetherimides. For example, it has proven to be economical to form a modified polyetherimide masterbatch resin containing from about 10 to 15 weight percent of high density polyethylene and then blend this masterbatch with unmodified polyetherimide resin to form the final resin with from about 0.1 to about 2.5 weight percent polyethylene.

The polyolefin may be added to a granulated or pelleted high heat amorphous resin product. The polyolefin and high heat amorphous resin are thoroughly mixed to achieve a substantially homogenous product with uniform improved properties. When the polyolefin is admixed with the high heat amorphous resin in granulated form, a high degree of homogenization can be achieved if the polyolefin and high heat amorphous resin mixture is first melted in an extrusion apparatus, vigorously mixed, and extruded with cooling of the extruded product. The extruded product is then advantageously granulated or pelleted. This operation can be carded out with conventional screw extruders.

Injection molding of articles with the modified high heat amorphous resin such as the polyethermide of the present invention is considerably more efficient than using unmodified high heat amorphous resins, especially for thin walled parts. This efficiency results not only from the reduction in the number of parts sticking but also from the raising of the melt index of the high heat amorphous resin thus improving the melt flow of the polymer within the mold. It has also been discovered that incorporation of an effective amount of high density polyolefin decreases the injection pressure needed to fill the mold which further contributes to the efficiency of an injection molding process using the composition of the present invention.

Surprisingly, incorporation of high density polyolefins such as HDPE can accomplish the desirable results without substantially adversely affecting the physical properties of the unmodified polyetherimide. For example, HDPE modified resins retain high distortion temperatures and high tensile and elongation properties which are required for present day use of high heat amorphous resins.

Reinforcing fillers comprise an additional optional component of the present invention. Reinforcing fillers, per se, are also well known in the art. Accordingly, virtually any reinforcing filler known in the art is suitable according to the present invention. For example, the present invention may include at least one inorganic filler selected from glass, asbestos, talc, quartz, calcium carbonate, calcium sulfate, barium sulfate, carbon fiber, silica, zinc oxide, zirconium oxide, zirconium silicate, strontium sulfate, alumina, anhydrous aluminum silicate, barium ferrite, mica, feldspar, clay, magnesium oxide, magnesium silicate, nepheline syenite, phenolic resins, wollastonite, and titanium dioxide. The more preferred reinforcing fillers include glass, wollastonite, calcium carbonate, silica, or mixtures thereof, with glass being the most preferred. The term glass fillers in intended to include any type of glass used as a filler such as glass fibers, mill glass, glass spheres and microspheres, etc.

The reinforcing fillers am generally included in the thermoplastic resin composition in amounts ranging from about 20 to about 60 percent by weight of the thermoplastic resin composition. In a preferred embodiment of the invention, the reinforcing fillers am included in amounts ranging from about 25 to about 50 percent by weight, and even more preferably, from about 30 to about 40 percent by weight of the thermoplastic resin composition.

The composition of this invention may further contain other fillers, stabilizers, plasticizers, flexibilizers, surfactant agents, pigments, dyes, reinforcements, flame retardants, and diluents in conventional amounts.

The compositions of this invention may be prepared according to conventional techniques. In this regard, it is noted that prior art blending techniques are generally satisfactory. A preferred method is to blend the polymers and any additives which are present, extrude the blend, and chop the extrudate into pellets. The pellets are then molded according to conventional methods for molding solid thermoplastic compositions.

The thermoplastic resin compositions described above have a unique combination of advantages. These advantages include; enhanced heat and chemical resistance such as higher HDT and increased blister resistance; a reduction in the warpage of polysulfides through the introduction of a high heat amorphous resin; enhanced ductility; increased flow; and, as described earlier, a no flash capability.

Given this extensive list of advantages, there are a number of applications for which the thermoplastic resin composition of the invention is particularly well suited. These applications include no flash, high heat molded parts such as electrical connectors, chip carders, motor caps, brush holders, ignition pans, alternator parts, intake manifolds or the like. The applications for this resin would also include industrial applications such as small engines as well as pumps and valves and the like. Additional applications would also include housewares which typically include polysulfides. One particularly preferred application is no flash, high heat electrical connectors.

The following examples are provided to illustrate the present invention and do not limit the invention. In the examples, all parts and percentages are by weight unless otherwise specified.

EXAMPLES

Example 1

The following Formulations 1-6 were prepared as follows:
LAB SCALE
All materials (PPS, PEI, Glass, etc.) were dry blended and dried for a minimum of four hours at 150° C. The blend was then extruded on an Egan single screw extruder and pelletized. Test parts were injection molded on a standard injection molding machine using normal PPS molding parameters.
PRODUCTION SCALE
The non-glass components of the blend were throat fed into a 58 mm WP twin screw extruder. The glass was added downstream in the extruder using processing parameters typical of PPS/glass compounding. The blended material was then pelletized in a normal fashion.

TABLE 1

| Formulations | 1 | 2 | 3 | 4 | 5 | 6 |
|---|---|---|---|---|---|---|
| Ultem 1000 | 70 | 30 | 26.67 | 20.58 | 1.72 | 27.9 |
| PPS 160 | 0 | 40 | 39.83 | 39.42 | 38.28 | 37.1 |
| 10% HDPE in Ultem 1000 | | 0 | 3.30 | 10.00 | 30.00 | 5* |
| OCF49EE glass | 30 | 30 | 30 | 30 | 30 | 30 |
| HDT (°C.) | 206 | 216 | 230 | 226 | 212 | 212 |
| Blister Temp. (°C.) | 221 | 248 | 260 | 271 | 250 | 250 |

*This number represents part of pure HDPE (i.e. no Ultem).

Figure 1:
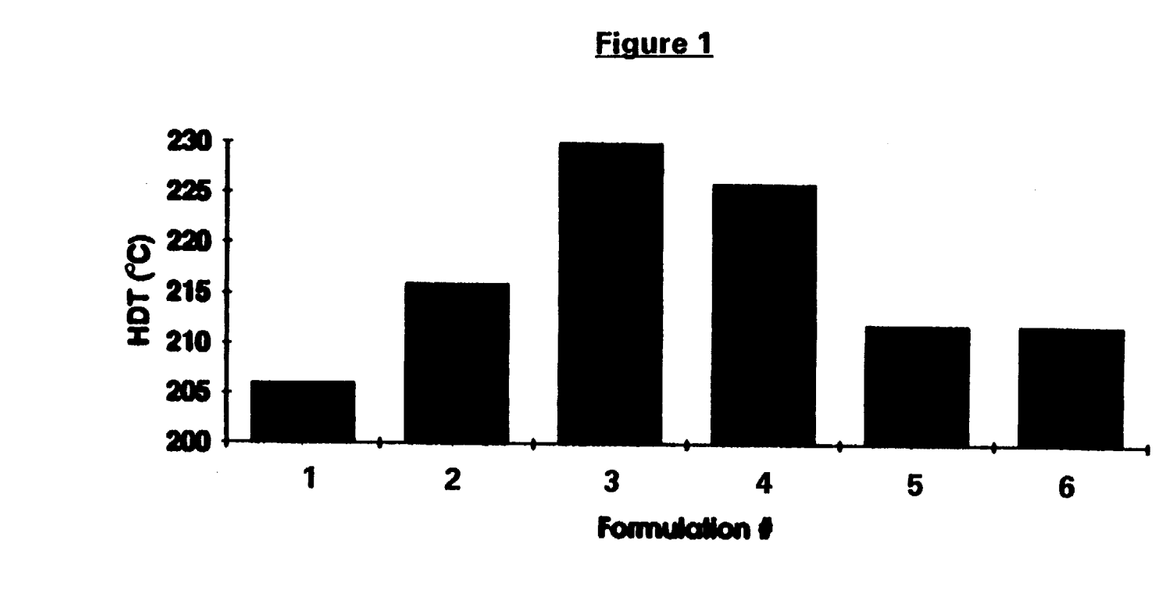
FIG. 1 shows the heat distortion temperatures of compositions prepared in accordance with the invention.
Figure 2:
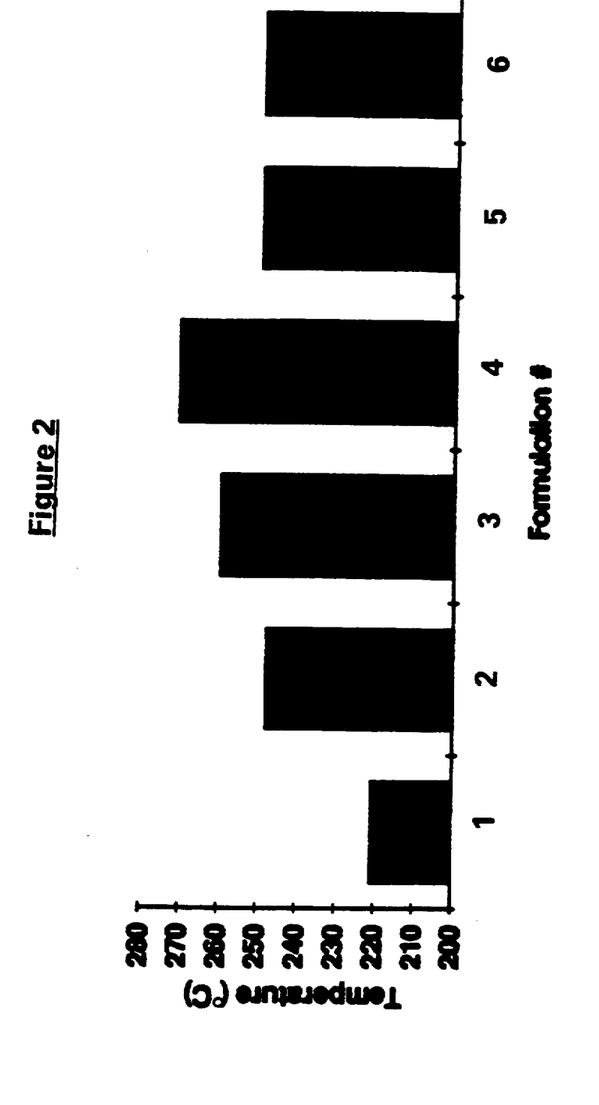
FIG. 2 shows the blister temperatures of compositions prepared in accordance with the invention.
Figure 3:
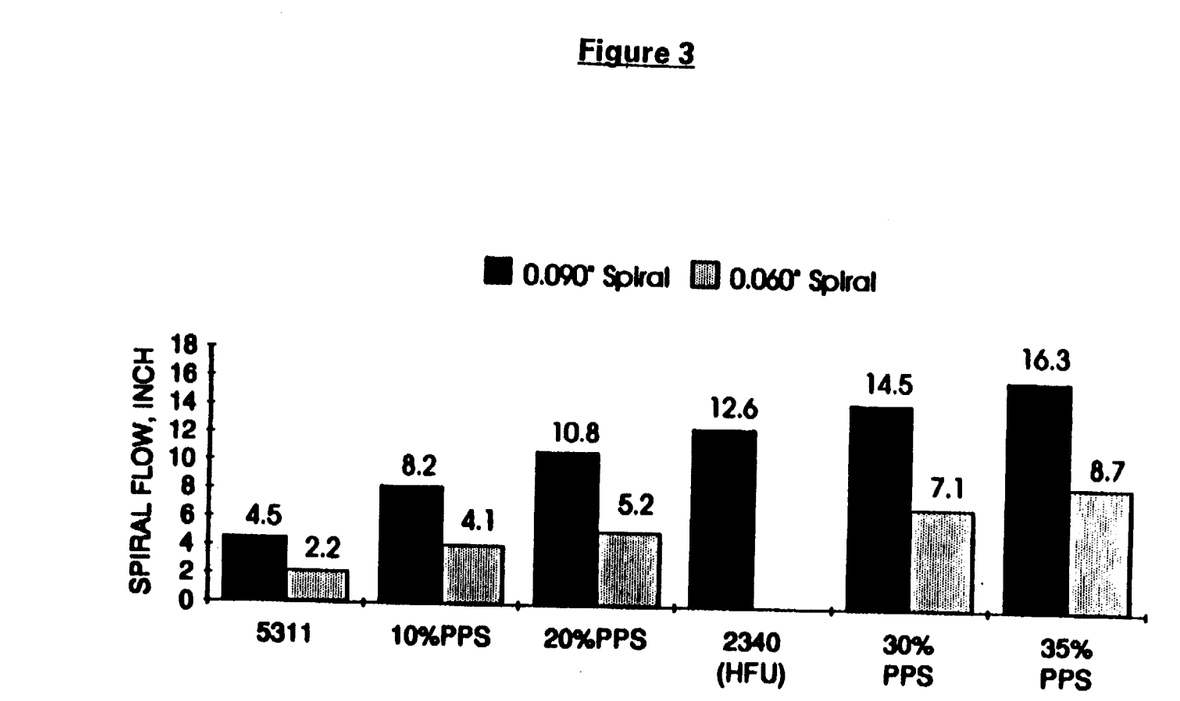
FIG. 3 shows the spiral flow characteristics of compositions prepared in accordance with the invention.

As can be seen from the data above, as well as the charts contained in FIGS. 2 and 3, the addition of a polyolefin (HDPE) into polysulfide (PPS)/high heat amorphous resin (PEI) glass reinforced blend increased the heat distortion temperature of the matrix over the increase observed by incorporating only a polysulfide (PPS) into a high heat amorphous resin (PEI) matrix.

Example 2

The following Formulations 1-6 were prepared in the same manner as those in Example 1, except that the high heat amorphous resins used were PAS and PSO rather than the PEI of Example 1.

TABLE 2

| Formulations | 1 | 2 | 3 | 4 | 5 | 6 |
|---|---|---|---|---|---|---|
| Radel 5000 (PAS) | 30 | 26.7 | — | — | — | — |
| Udel P1700 (PSO) | — | — | 30 | 26.7 | — | — |
| PPS 160 | 40 | 40 | 40 | 40 | — | — |
| 10% HDPE in Ultem | — | 3.3 | — | 3.3 | 3.3 | 0 |
| Ultem 1000 | — | — | — | — | 96.7 | 100 |
| Fibreglass | 30 | 30 | 30 | 30 | — | — |
| HDT (°C.) | 212 | 227 | 187 | 196 | 197 | 198 |

The addition of a polyolefin (HDPE) into a polysulfide (PPS)/high heat amorphous resin (PPO) glass reinforced blend and a polysulfide (PPS)/high heat amorphous resin (PAS) glass reinforced blend increased the heat distortion temperature (HDT) of these blends. These blends also maintained excellent flow and good chemical resistance. Accordingly, these blends are well suited for high temperature applications in the automotive and electrical industries where excellent flow and chemical resistance are required.

It is surprising to note that the addition of polyolefin to a pure high heat amorphous resin (PEI) caused the HDT to drop wheras the addition of the polyolefin to a polysulfide/high heat amorphous resin blend caused the HDT to increase substantially.

Example 3

The following Formulations 1-7 were prepared in the same manner as in Example 1.

TABLE 3

| | 1 | 2 | 3 | 4 | 5 | 6 | 7 |
|---|---|---|---|---|---|---|---|
| Formulations: | | | | | | | |
| PPS 160 | — | — | 50 | 50 | 40 | 39.83 | 39.42 |
| PPS140 | 50 | 50 | — | — | — | — | — |
| Ukem 1040 | 20 | 16.7 | 20 | 16.7 | — | — | — |
| Ukem 1000 | — | — | — | — | 30 | 26.87 | 20.58 |
| 10% HDPE in Ultem 1000 | — | 3.3 | — | 3.3 | — | 3.3 | 10.0 |
| OCF497EE | 30 | 30 | 30 | 30 | 30 | 30 | 30 |
| Properties: | | | | | | | |
| Maximum Blister Temp. (F.) | 450 | 500 | 500 | 520 | 480 | 500 | 520 |

From the above it can be seen that polyolefin (HDPE) modified PPS/PSI glass reinforced blends exhibited improved infra-red soldering blister resistance and excellent moldability as compared to the pure blend. These HDPE modified blends still maintained all the favorable properties of the pure blends, including excellent flow characteristics of the PPS component with no flash. Accordingly, the modified blends can be used in the high heat electrical connector applications where excellent flow, no flash, and heat and chemical resistance properties are required.

Example 4

Figure 4:
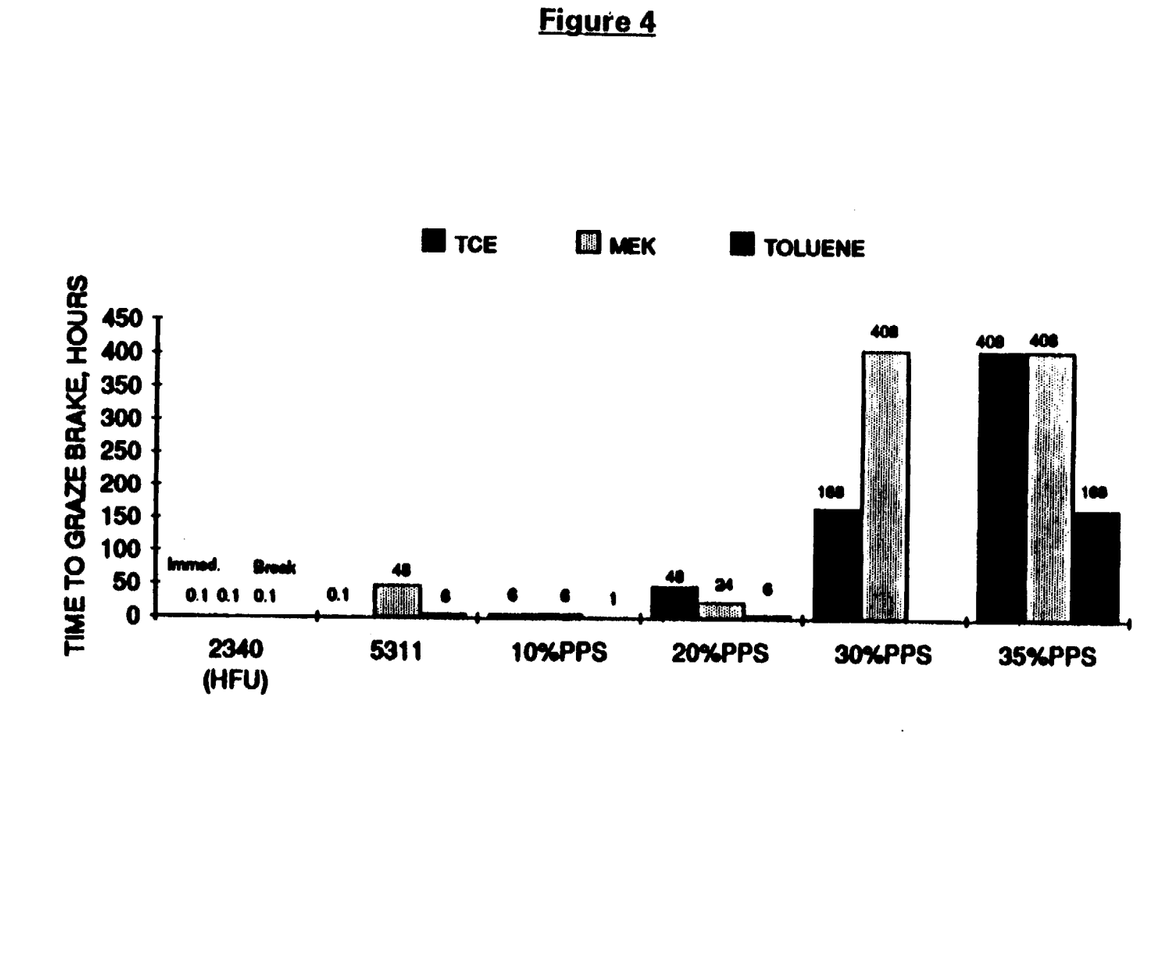
FIG. 4 shows the chemical resistance of formulations prepared in accordance with the invention.
Figure 5:
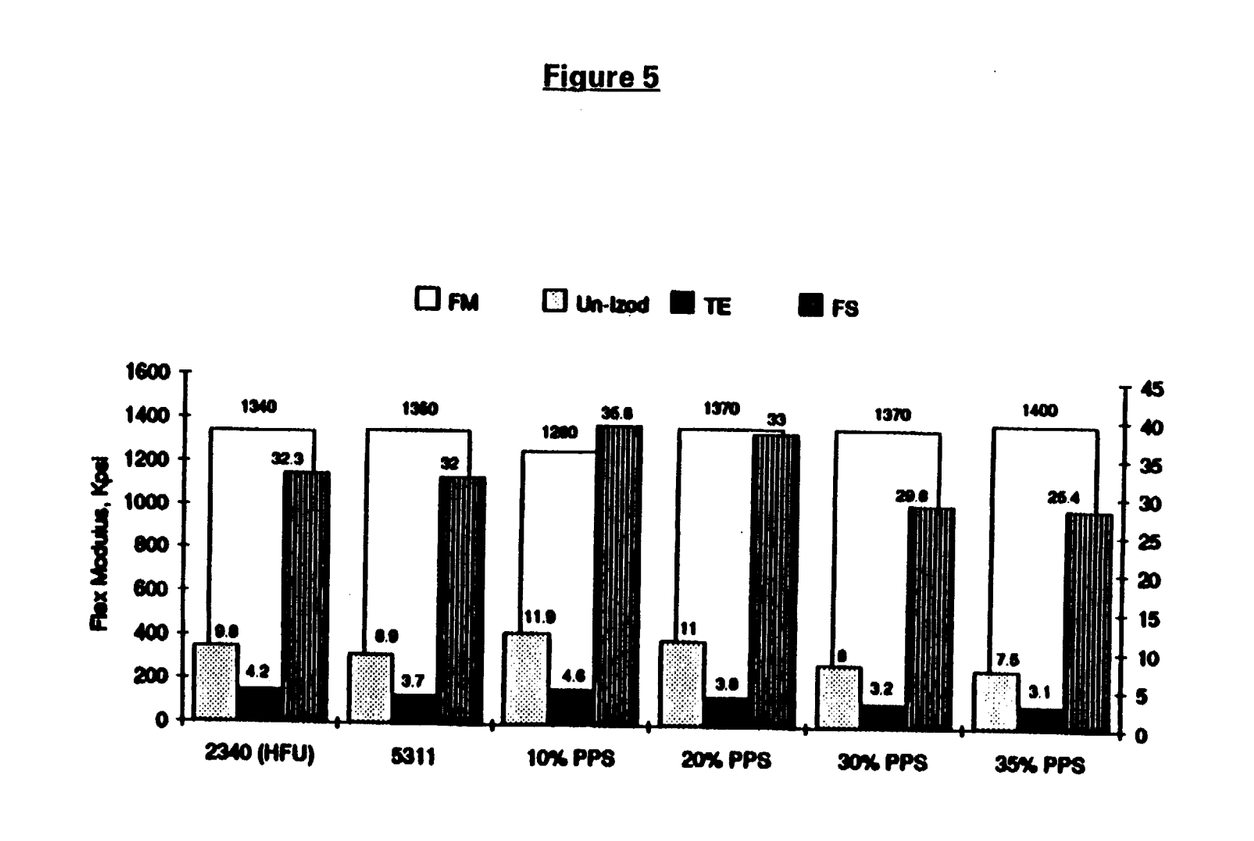
FIG. 5 shows the flexural modulus of compositions prepared in accordance with the invention.
Figure 6:
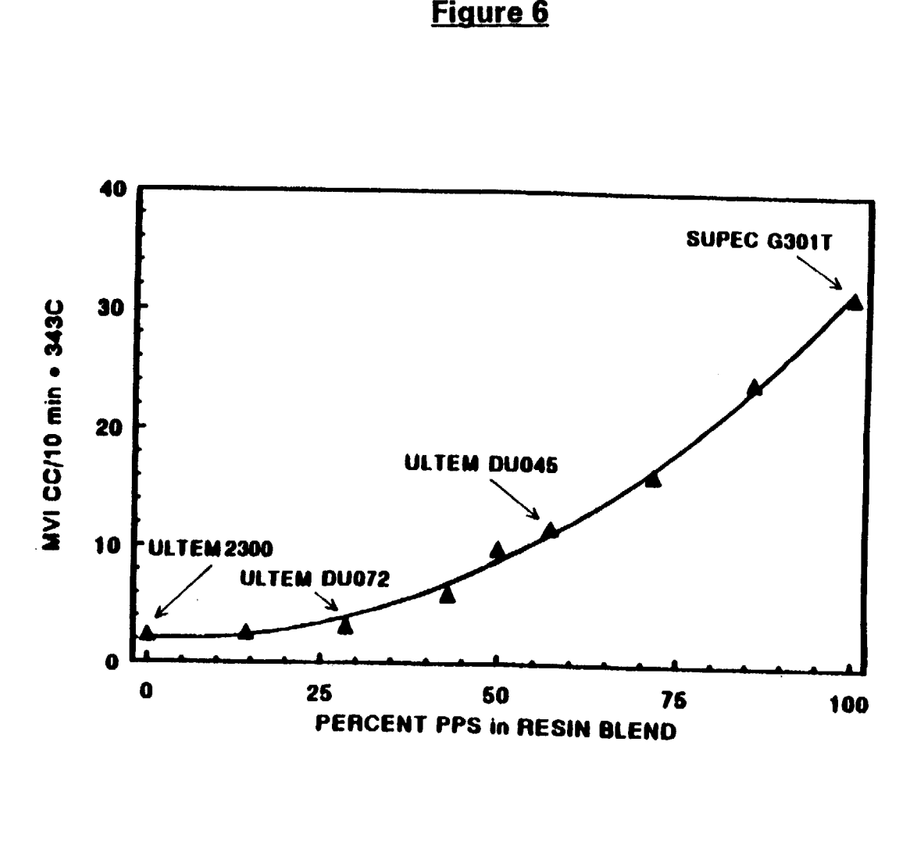
FIG. 6 shows the melt flow characteristics of formulations prepared in accordance with the invention.
Figure 7:
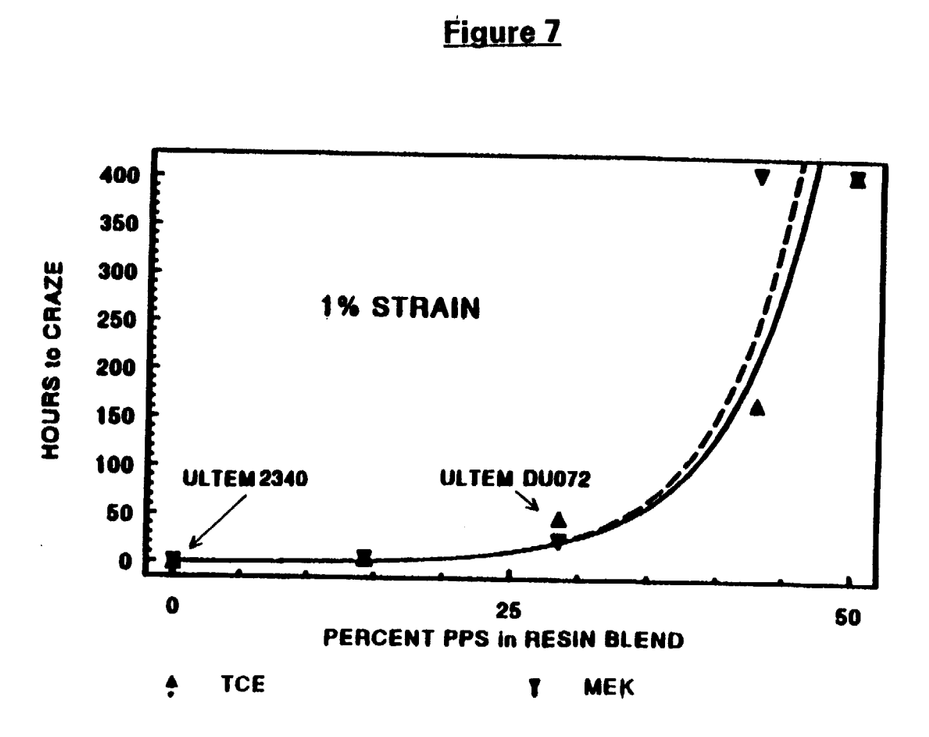
FIG. 7 shows the environmental stress crack resistance of formulations prepared in accordance with the invention.
Figure 8:
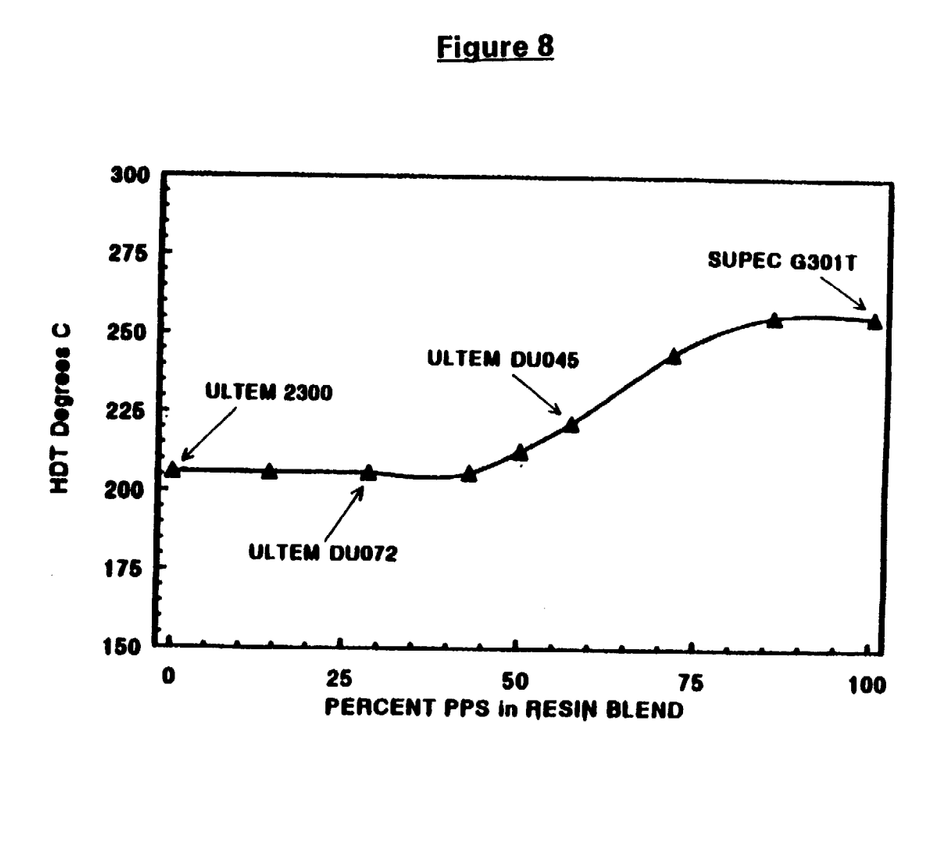
FIG. 8 shows the heat distortion temperatures of formulations prepared in accordance with the invention.

The following formulations were prepared in the same manner as Example 1. The following Tables 6-7 and FIGS. 3, 4 and 5 report and graphically illustrate the various changes in chemical properties, for a 30% glass fiber reinforced PEI/PPS composition e.g., stress cracking, impact strength, tensile elongation (in Kpsi), flex strength (in Kpsi). and flexural modulus (in Kpsi), achieved by combining a high heat amorphous resin (PEI), a polysulfide (PPS), and reinforcing fillers such as glass.

TABLE 4

| Formulation | 1 | 2 | 3 | 4 | 5 | 6 | 7 |
|---|---|---|---|---|---|---|---|
| Ultem 1000 | 70 | 60 | 50 | 40 | 35 | — | — |
| PPS 160 | 0 | 10 | 20 | 30 | 35 | — | — |
| Fiber Glass | 30 | 30 | 30 | 30 | 30 | — | — |
| Unem 5311 | — | — | — | — | — | 100 | — |
| Ultem 2340 | — | — | — | — | — | — | 100 |

TABLE 5

| | | | | | | | |
|---|---|---|---|---|---|---|---|
| Melt Vol. Index, 343 C. | 3.2 | 4.3 | 6.9 | 10.1 | 11.6 | 3.5 | 7.7 |
| Spiral Flow. | | | | | | | |
| @ 60 mil | — | 4.1 | 5.2 | 7.1 | 8.2 | 2.2 | — |
| @ 90 mil | — | 8.2 | 10.8 | 14.5 | 16.3 | 4.5 | 12.6 |
| Stress Cracking, Toluene; TCE;MEK See attached Figure. | | | | | | | |
| Flammability @1/32", UL94 | — | VO | VO | VO | VO | — | VO |
| HDT @264 psi, ⅛", C. | 210 | 209 | 199 | 207 | 211 | — | — |
| Unnotch Izod Impact, ft-lb/in | — | 11.9 | 11.0 | 8.0 | 7.5 | 9.8 | 8.9 |
| Notch izod impact, ft-lb/in | — | 1.6 | 1.3 | 1.3 | 1.2 | 1.3 | 1.2 |

TABLE 5-continued

| | | | | | | |
|---|---|---|---|---|---|---|
| Tensile Elongation, % | — | 4.6 | 3.8 | 3.2 | 3.1 | 4.2 | 3.7 |
| Tensile Strength | — | 16 | 15 | 13 | 12 | 16 | 14 |
| Flex Modulus | — | 1260 | 1370 | 1370 | 1400 | 1350 | 1340 |
| Flex Strength | — | 36.8 | 33.0 | 29.8 | 28.4 | 32.3 | 32.0 |

Example 5

The following Formulations depicted in FIGS. 6-10 were prepared in the same manner as described in Example 1.

From the above and the attached FIGS. 1-10, it can be seen that the combination of a polysulphide (PPS) to a high heat amorphous (PEI) glass reinforced blend provides the following unique combination of advantages; namely, (1) good melt flow, (2) improved ESCR, (3) improved heat resistance as measured by HDT, (4) improved ductility over a pure PPS blend, (5) a substantial rise in the blister resistance temperature at surprisingly low levels of PPS, and (6) improved flash as compared to a pure blend.

Figure 9:
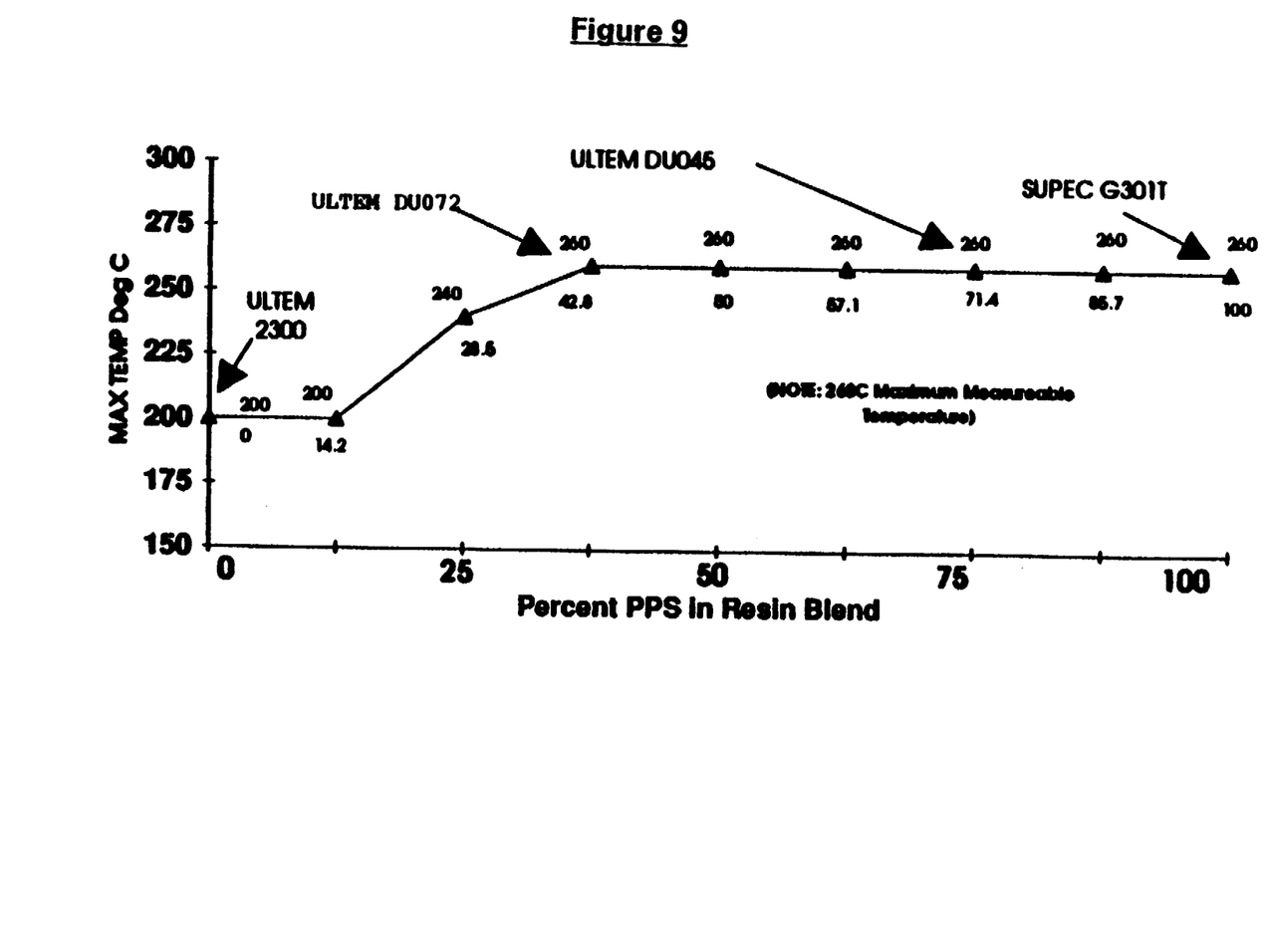
FIG. 9 shows the spiral flow characteristics of formulations prepared in accordance with the invention.
Figure 10:
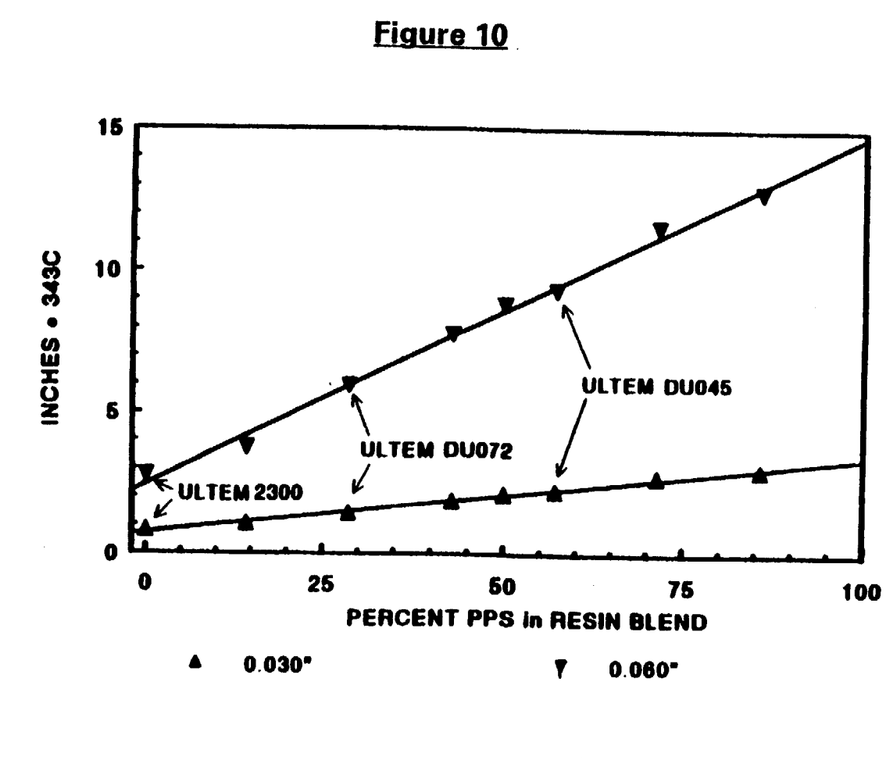
FIG. 10 shows the spiral flow characteristics of formulations prepared in accordance with the invention.

It should be noted that while the maximum measurable temperature for the blister resistance in FIG. 9 was 260° C., the results for about 50 parts PPS to about 85.7 parts PPS appeared to show a higher blister resistance than either the Ultem DU072 with 42.8 parts PPS or the Supec G301T.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including the equivalents thereof.

What is claimed is:

1. A no flash thermoplastic resin composition having improved flow and good thermal and chemical resistance, comprising:
   (A) at least one high heat amorphous resin in an amount ranging from about 0.5 to about 43.5 weight percent of the overall composition, wherein said high heat amorphous resin comprises a polyetherimide polysulfone, polyarylsulfone or polyethersulfone;
   (B) at least one polysulfide in an amount ranging from about 33.5 to abut 76.5 weight percent of the overall composition, wherein said polysulfide has the formula:

$$-(-R_1-S_n-)-$$

wherein $R_1$ is a divalent aromatic radical and n is a number from 1-5;
   (C) at least one polyolefin consisting essentially of a high crystalline polyolefin in an amount ranging from about 0.1 to about 5 weight percent of the overall composition and optionally
   (D) at least one reinforcing filler in an amount ranging from about 20 to about 60 weight percent of the overall composition, where in the sum of said weight percents is 100 percent.

2. The thermoplastic resin composition according to claim 1, wherein the crystallinity of said polyolefin ranges from about 60 to about 90 percent.

3. The thermoplastic resin composition according to claim 2, wherein said polyolefin is comprised primarily of polyethylene, polypropylene, polybutylene, or mixtures thereof.

4. The thermoplastic resin composition according to claim 3, wherein said polyolefin is comprised primarily of polyethylene.

5. The thermoplastic resin composition according to claim 1, wherein the amounts of said high heat amorphous resin and said reinforcing filler are sufficient to provide a no-flash thermoplastic resin composition.

6. The thermoplastic resin composition according to claim 1, wherein said high heat amorphous resin comprises polyetherimide having the formula:

where m represents a whole number in excess of 1, and the group —O—A<
is selected from:

R' being hydrogen, lower alkyl or lower alkoxy, Z is a member of the class consisting of (1 ):

and and (2) divalent organic radicals of the general formula:

where X is a member selected from the class consisting of divalent radicals of the formulas:

$$-C_yH_{2y}-, -\overset{\overset{O}{\|}}{C}-, -\overset{\overset{O}{\|}}{\underset{\underset{O}{\|}}{S}}-, -O-, \text{ and } -S-$$

where q is 0 or 1, y is a whole number from 1 to 5, and R is a divalent organic radical selected from the class consisting of (1) aromatic hydrocarbon radicals having from 6 to 10 carbon atoms and halogenated derivatives thereof, (2) alkylene radicals and cycloalkylene radicals having from 2 to 20 carbon atoms, (3) C$_{(2-8)}$ alkylene terminated polyorganosiloxane, and (4) divalent radicals included by the formula:

where Q is a member selected from the class consisting of:

$$-C_xH_{2x}-, -\overset{\overset{O}{\|}}{C}-, -\overset{\overset{O}{\|}}{\underset{\underset{O}{\|}}{S}}-, -O-, \text{ and } -S-$$

where x is a whole number from 1 to 5, inclusive.

7. The thermoplastic resin composition according to claim 6, wherein the polyethereimide is of the formula:

and the divalent bonds of the —O—Z—O— radical are in the 3,3'; 3,4'; 4,3'; or the 4,4'position and m is a whloe number in excess of 1.

8. The thermoplastic resin composition according to claim 7, wherein Z is:

and R is selected from:

9. The thermoplastic resin composition according to claim 8, wherein said polyetherimide is of the formula:

wherein m is a whole number in excess of 1.

10. The thermoplastic resin composition according to claim 1, wherein R$_1$ of the polysulfide is aromatic and selected from phenylene, biphenylene, naphthylene, oxydiphenyl or lower alkyl, lower alkoxy or halogen substituted derivatives thereof, and n is one.

11. The thermoplastic resin composition according to claim 10, wherein said polysulfide comprises polyphenylene sulfide.

12. The thermoplastic resin composition according to claim 1; wherein said reinforcing filler comprises at least one inorganic filler selected from glass, asbestos, talc, quartz, calcium carbonate, calcium sulfate, barium sulfate, carbon fiber, silica, zinc oxide, zirconium oxide, zirconium silicate, strontium sulfate, alumina, anhydrous aluminum silicate, barium ferrite, mica, feldspar, clay, magnesium oxide, magnesium silicate, nepheline syenite, phenolic resins, wollastonite, and titanium dioxide.

13. The thermoplastic resin composition according to claim 12, wherein said reinforcing filler comprises glass, wollastonite, calcium carbonate, silica, or mixtures thereof.

14. The thermoplastic resin composition according to claim 12, wherein said reinforcing filler comprises from about 20 to about 60 percent by weight of the thermoplastic resin composition.

15. The thermoplastic resin composition according to claim 14, wherein said reinforcing filler comprises from about 25 to about 50 percent by weight of the thermoplastic resin composition.

16. The thermoplastic resin composition according to claim 15, wherein said reinforcing filler comprises from about 30 to about 40 percent by weight of the thermoplastic resin composition.

17. The thermoplastic resin composition according to claim 1, wherein the amount of said polyolefin is sufficient to enhance the release properties of the themoplastic resin composition.

18. The thermoplastic resin composition according to claim 1, wherein the amount of said polyolefin ranges from about 0.1 weight percent to about 1.0 weight percent of the thermoplastic resin composition.

19. The thermoplastic resin composition according to claim 1, wherein said polyolefin has a weight average molecular weight greater than about 300,000.

20. The thermoplastic resin composition according to claim 19, wherein said polyolefin has a weight average molecular weight from about 300,000 to about 500,000.

21. The thermoplastic resin composition according to claim 3, wherein said polyolefin has a molecular weight of from about 3 million to about 6 million.

22. The thermoplastic resin composition according to claim 1, wherein:
    (A) the amount of said at least one high heat amorphous resin ranges from about 15 to about 31 weight percent of the overall composition;
    (B) the amount of said at least one polysulfide ranges from about 46 to about 62 weight percent of the overall composition;
    (C) the amount of said at least one polyolefin ranges from about 0.1 to about 1.0 weight percent of the overall composition; and
    (D) the amount of said at least one reinforcing filler ranges from about 25 to about 40 weight percent of the overall composition, wherein the sum of said weight percents is 100 percent.

23. The thermoplastic resin composition according to claim 1, wherein said high heat amorphous resin comprises polyetherimide, said polyolefin comprises polyethylene, and said filler comprises glass.

24. A no flash, high heat molded pan having improved thermal and chemical resistance comprising a molded part selected from electrical connectors, chip carders, motor caps, brush holders, ignition parts, alternator parts, and intake manifolds, wherein said molded part comprises the composition according to claim 1.

25. The no flash high heat molded part according to claim 24, wherein said molded part comprises an electrical connector.

* * * * *